United States Patent
Srinivasan et al.

(10) Patent No.: US 12,393,852 B2
(45) Date of Patent: Aug. 19, 2025

(54) MACHINE LEARNING FOR CATEGORIZING TEXT

(71) Applicant: The Boeing Company, Chicago, IL (US)

(72) Inventors: Rajkumar Srinivasan, Karnataka (IN); Liessman E. Sturlaugson, St. Louis, MO (US); Seema Chopra, Karnataka (IN)

(73) Assignee: The Boeing Company, Arlington, VA (US)

( * ) Notice: Subject to any disclaimer, the term of this patent is extended or adjusted under 35 U.S.C. 154(b) by 971 days.

(21) Appl. No.: 17/382,148

(22) Filed: Jul. 21, 2021

(65) Prior Publication Data

US 2023/0026656 A1   Jan. 26, 2023

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS

| | | | |
|---|---|---|---|
| 11,468,232 B1* | 10/2022 | Rath | G06V 30/2455 |
| 2005/0021508 A1* | 1/2005 | Matsubayashi | G06F 16/3347 |
| | | | 707/E17.08 |
| 2006/0212897 A1* | 9/2006 | Li | H04N 7/17336 |
| | | | 725/32 |
| 2006/0259473 A1* | 11/2006 | Li | G06Q 30/02 |
| 2008/0319746 A1* | 12/2008 | Okamoto | G06F 16/345 |
| | | | 704/245 |
| 2020/0365262 A1* | 11/2020 | Sreenivasan | G16H 40/40 |
| 2021/0103700 A1* | 4/2021 | Toplyn | G06N 20/00 |
| 2021/0383170 A1* | 12/2021 | Alshawabkeh | G06F 18/24323 |
| 2022/0174029 A1* | 6/2022 | Hirota | H04L 51/02 |
| 2024/0143430 A1* | 5/2024 | Gandhi | G06F 11/079 |

* cited by examiner

*Primary Examiner* — Paulinho E Smith
(74) *Attorney, Agent, or Firm* — Alleman Hall & Tuttle LLP

(57) ABSTRACT

A method of categorizing natural language text is disclosed. The method includes selecting candidate keywords from a list of potential keywords based on the natural language text. The method also includes generating, using a classification machine learning model (MLM), a list of candidate categories based on the potential keywords. The method also includes generating, using a similarity comparison MLM, a similarity score based on the candidate categories and a set of pre-determined categories. The method also includes assigning a selected category based on the similarity score to the natural language text.

21 Claims, 9 Drawing Sheets

| EXPERIMENTAL ACCURACY | | |
|---|---|---|
| 702 | KEYWORD MODEL | CONVENTIONAL MODEL 704 |
| 706 ACCURACY | >40% | <35% |
| 708 MISCLASSIFICATION RATE | <5% | >8% |

MACHINE LEARNING FOR CATEGORIZING TEXT

BACKGROUND

Aircraft are tested extensively prior to delivery to a customer. Problems or issues found by test pilots or other test personnel are reported in the form of short text messages referred to as "flight squawks". Testing of multiple aircraft of a single model type of aircraft may result in hundreds or in thousands of flight squawks. Flight squawks are categorized and processed so that all technical issues can be resolved prior to aircraft delivery.

Current automation approaches are not practical or have limited effectivity because of the high data cardinality and low amount of training data present in flight squawks. High data cardinality means that many unique instances of data are present within the data set ("cardinality" in mathematics is a measure of the number of elements in a set). High data cardinality means that a machine learning model will have difficulty in finding patterns in the data in order to achieve the desired degree convergence. The higher the data cardinality, the more training data is desired to achieve a desired degree of convergence.

Convergence means that multiple outputs of the machine learning algorithm from the same input are close to each other within a pre-determined degree. If insufficient convergence occurs, then the desired accuracy of the machine learning model when categorizing live data (i.e., new data) is sometimes not attainable.

In turn, a low amount of training data means that insufficient training data exists in order for a machine learning algorithm to arrive at a pre-determined degree of convergence. In other words, machine learning algorithms, particularly unsupervised machine learning algorithms used in natural language processing, rely on massive amounts of data to achieve a high degree of convergence. Without sufficient data, the desired degree of convergence is not possible.

Thus, a technical challenge arises when using machine learning models to automatically categorize sets of high data cardinality, low training data. When a data set has both high cardinality and a low amount of data, then the desired degree of convergence of an ordinary machine learning model is not possible. The one or more embodiments address these and other technical issues.

SUMMARY

The one or more embodiments provide for a method of categorizing natural language text using a processor configured to execute instructions stored on a memory to perform the steps. The method includes selecting candidate keywords from a list of potential keywords based on the natural language text, the candidate keywords having a probability of success being greater than a threshold value. The method also includes generating, using a classification machine learning model (MLM), a list of candidate categories based on the potential keywords. The method also includes generating, using a similarity comparison MLM, a similarity score based on the candidate categories and a set of pre-determined categories. The method also includes assigning a selected category based on the similarity score to the natural language text.

The one or more embodiments provide for another machine learning method. The method includes executing a classification machine learning model (MLM). A first input of the classification MLM includes a first model vector generated using potential keywords extracted from an instance of natural language text. A first output of the classification MLM is corresponding predictions that a corresponding potential keyword is a corresponding candidate keyword. The method also includes generating candidate keywords. The candidate keywords are ones of the potential keywords having selected predictions in the corresponding predictions that are above a first threshold value. The method also includes combining the potential keywords into candidate categories that include combinations of the potential keywords. The method also includes transforming the candidate keywords into a second model vector. The method also includes executing a similarity comparison MLM. A second input of the similarity comparison MLM includes the second model vector. A third input of the similarity comparison MLM includes pre-determined categories built from at least some of the candidate keywords. A second output of the similarity comparison MLM is similarity measures that measure similarities between the candidate categories and the pre-determined categories. The method also includes assigning, based on the similarity measures, a selected category to the instance of natural language text. The selected category is selected from among the candidate categories. The method also includes returning the selected category.

The one or more embodiments also provide for a system. The system includes a data repository. The data repository stores a first model vector and potential keywords. The data repository also stores an instance of natural language text. The first model vector is generated using the potential keywords extracted from the instance of natural language text. The data repository also stores corresponding predictions. The data repository also stores a corresponding potential keyword, and a corresponding candidate keyword. The corresponding predictions include predictions that the corresponding potential keyword is the corresponding candidate keyword. The data repository also stores candidate keywords. The data repository also stores a first threshold value. The candidate keywords are ones of the potential keywords having selected predictions in the corresponding predictions that are above the first threshold value. The data repository also stores a second threshold value. The data repository also stores candidate categories including combinations of the potential keywords. The data repository also stores a second model vector. The data repository also stores pre-determined categories built from at least some of the candidate keywords. The data repository also stores similarity measures that measure similarities between the candidate categories and the pre-determined categories. The data repository also stores a selected category. The system also includes a classification machine learning model (MLM). The classification MLM is configured to receive, as an input, the first model vector. The classification MLM is also configured to generate, as output, the corresponding predictions that the corresponding potential keyword is the corresponding candidate keyword. The system also includes a candidate category generator. The candidate category generator is configured to generate the candidate keywords. The candidate category generator is also configured to combine the potential keywords into the candidate categories. The system also includes a vector generator configured to transform the candidate keywords into the second model vector. The system also includes a similarity comparison MLM. The similarity comparison MLM is configured to receive the second model vector. The similarity comparison MLM is also configured to receive the plurality of predetermined categories. The similarity comparison MLM is also configured to output the plurality of similarity measures. The system also includes a category selection engine. The category selection engine is configured to assign, based on the plurality of similarity measures, the selected category to the instance of natural language text. The category selection engine is also configured to return the selected category.

Other aspects of the one or more embodiments will be apparent from the following description and the appended claims.

DETAILED DESCRIPTION

Figure 1:
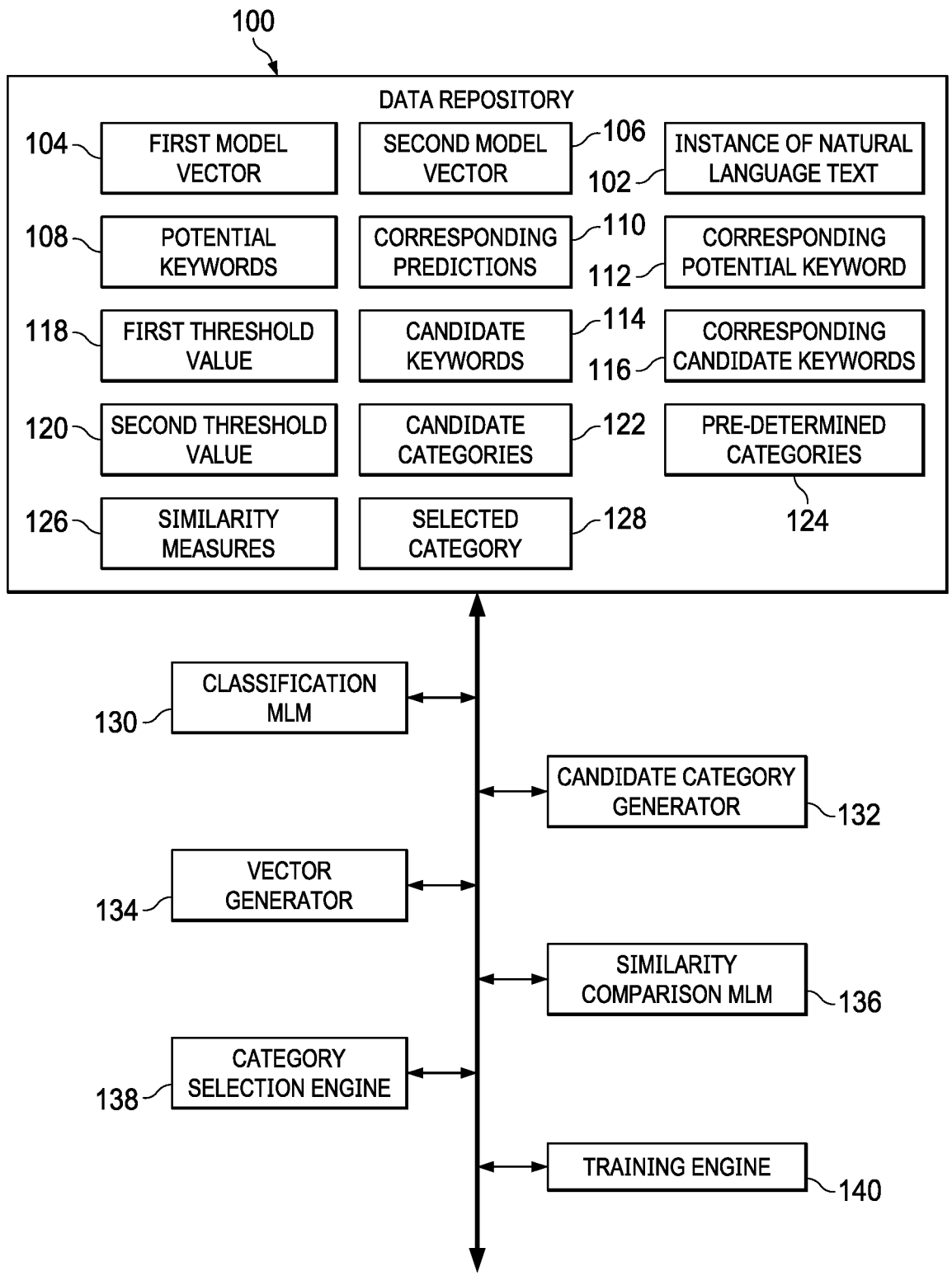
FIG. 1 shows a block diagram of a computing system, in accordance with one or more embodiments.

Specific embodiments of the one or more embodiments will now be described in detail with reference to the accompanying figures. Like elements in the various figures are denoted by like reference numerals for consistency.

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about." Similarly, the term, "plurality," as used herein may also be referred to as a list, collection, or ensemble.

The one or more embodiments that address the technical challenges described above may be summarized as follows. Keywords from the category names are used as dependent variables, and word vectors from the squawk text are used as independent variables to build individual keyword models. The similarity between prior categories and concatenated predicted keywords based on a similarity measure (cosine similarity score) determine the final predicted categories. A rejection mechanism using a threshold in similarity score ensures low misclassification rate by prompting the user for manual categorization when the model determines it cannot make an accurate determination.

The one or more embodiments herein consider each category to be composed of multiple keywords, rather than each category being its own class. The output of binary classifiers for each keyword are ranked and combined to build up an entire (and potentially new) category. The combination of individual keyword predictions is transformed into a vector and compared to the vector of a list of actual categories using a similarity measure. The category with the highest similarity score, relative to similarity scores of other categories, is taken as the predicted category. Furthermore, a threshold is applied on the similarity score to increase the confidence on the final category. Anything below this threshold, while unable to automatically decide on a final category, still provides a recommended category based on the most probable partial keyword combination. This procedure helps to keep the misclassification rate as low as possible and to provide a partial or proposed categorization for flight squawks for which either no categorization had been done earlier or for flight squawks that have occurred only a very few times such that the keyword models did not have enough data to learn the relationships.

The one or more embodiments use independent features to create the decision plane or the probability distribution to classify keywords. The combination of keywords could indicate a complete category or at least a partial category. Additionally, by subdividing the problem from categories to keywords. Finally, the one or more embodiments provide for decomposition of the task from a category prediction task into individual keyword prediction tasks. Recharacterizing the machine learning approach in this manner gives the one or more embodiments the ability to perform partial categorization or classification when the prediction score on a data point does not cross a threshold.

Stated differently, the one or more embodiments consider each category to be composed of multiple keywords, rather than, for example, each category being its own class. The output of binary classifiers for each keyword are ranked and combined to build up an entire, potentially new category. The combination of individual keyword predictions is transformed into a vector and compared to the vector of a list of actual categories using a similarity measure. The category with the highest similarity score is taken as the predicted category. Furthermore, a threshold is applied on the similarity score to increase the confidence on the final category. Anything below this threshold, while unable to automatically decide on a final category, still provides a recommended category based on the most probable partial keyword combination. This approach helps to keep the misclassification rate as low as possible and to provide a partial or proposed categorization for flight squawks for which either no categorization had been performed earlier or for flight squawks that have occurred only a very few times such that the keyword models did not have enough data to learn the relationships.

Attention is now turned to the figures. FIG. 1 shows a block diagram of a computing system, in accordance with one or more embodiments. The computing system shown in FIG. 1 may be used to automatically categorize, using machine learning, flight squawks or other groups of relatively small (less than a few thousand) text messages. Note that the system of FIG. 1 sets definitions of various terms. The process of the one or more embodiments and the use of the various terms defined with respect to FIG. 1 are described with respect to FIG. 2A through FIG. 2F. Note that the arrows shown in FIG. 1 represent mutual communication channels among the various components shown, and may take the form a bus in some embodiments or wireless communication in other embodiments.

The computing system shown in FIG. 1 includes a data repository (100). In one or more embodiments, the data repository (100) is a storage unit and/or device (e.g., a file system, a database, a collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) stores a variety of information used by the engines, generators, and machine learning models described herein. For example, the data repository (100) stores an instance of natural language text (102). The instance of natural language text (102) may be a flight squawk, as defined above. However, the one or more embodiments are not limited to flight squawks, and may be applicable to other natural language text messages.

The data repository (100) also stores a first model vector (104). The first model vector (104) is a particular kind of vector. A vector is a data structure suitable for input into, or output from, a machine learning model (MLM). Thus, the first model vector (104) is solely a computer data structure and useful with respect to machine learning models. In the one or more embodiments, the first model vector (104) is specifically a first input of the classification MLM (130), described further below. The first model vector (104) is generated using potential keywords (108), also as described further below, extracted from the instance of natural language text (102). Stated differently, the first model vector (104) is the potential keywords (108) extracted from the instance of natural language text (102), but formatted into a vector format. The process of formatting the potential keywords (108) into a vector format is described with respect to step 22 of FIG. 2A.

The data repository (100) also stores a second model vector (106). The second model vector (106) is also a vector, as defined above. The second model vector (106), in particular, is the candidate keywords (114) (defined below) formatted into a vector format. The process of formatting the second model vector (106) is similar to the process for formatting the potential keywords (108) into the first model vector (104).

The data repository (100) also stores potential keywords (108). A potential keyword is a word or alphanumeric text string taken from the instance of natural language text (102). Thus, in an embodiment, all of the words or alphanumeric text strings in the instance of natural language text (102) could be the potential keywords (108). However, in some embodiments, pre-processing could be used to filter out some of the words or alphanumeric text strings in the instance of natural language text (102), and using what remains as the potential keywords (108).

The data repository (100) also stores corresponding predictions (110). The corresponding predictions (110) are machine-learned predictions that a corresponding potential keyword (112) (defined below) is a corresponding candidate keyword (116) (defined below). The corresponding predictions (110) are part of the output of the classification MLM (130) (defined below). In particular, the corresponding predictions (110) are the values of the features of the output vector of the classification MLM (130), defined below. The term "corresponding" is used because a one-to-one correspondence exists between a given prediction for a given keyword.

The data repository (100) also stores a corresponding potential keyword (112), which could be more than one of the potential keywords (108). A "potential keyword" is any word or alphanumeric string of text in the instance of natural language text (102) which has not been excluded from consideration as a keyword. The term "corresponding" in the corresponding potential keyword (112) is used because a one-to-one correspondence exists between a given potential keyword and a given candidate keyword, as well as between a given potential keyword and a given prediction.

The data repository (100) also stores candidate keywords (114). A candidate keyword is any keyword having a probability above a candidate threshold. In some cases, the candidate threshold may be zero (e.g, a candidate keyword is any keyword having a non-zero probability of actually being the final keyword selected). However, the candidate threshold may be above zero in some embodiments. Thus, the candidate keywords (114) may be characterized as ones of the potential keywords (108) having selected predictions in the corresponding predictions (110) that are above a first threshold value (118), defined below.

Additionally, the potential keywords may be described has having a "probability of success." The probability of success is defined as a probability that a potential keyword is a candidate keyword. Thus, the candidate keywords have a probability of success greater than a threshold value.

The data repository (100) also stores a corresponding candidate keyword (116), which could be more than one of the candidate keywords (114). The corresponding candidate keyword (116) is a given one of the candidate keywords (114) that corresponds to a given one of the potential keywords (108) and a given one of the corresponding predictions (110). Thus, the term "corresponding" is used to indicate a one-to-one mapping between the corresponding candidate keyword (116) and a given one of the corresponding predictions (110).

The data repository (100) also stores a first threshold value (118). The first threshold value (118) is a number that is used to determine when a given one of the corresponding predictions (110) is deemed high enough to qualify a corresponding potential keyword (112) as a corresponding candidate keyword (116). Thus, for example, it can be said that the candidate keywords (114) are ones of the potential keywords (108) having selected predictions in the corresponding predictions (110) that are above the first threshold value (118).

The data repository (100) also stores a second threshold value (120). The second threshold value (120) is another number, possibly different than the number selected for the first threshold value (118), that is used to determine when a given one of the similarity measures (126) (defined below) of the selected category (128) (defined below) is deemed high enough to qualify candidate categories (122) (defined below) as the selected category (128) (defined below). Thus, it can be said that when one of the candidate categories (122) has a given similarity measure from among the similarity measures (126) (defined below) that is above the second threshold value (120), then the given category is selected as the selected category (128) (defined below).

The data repository (100) also stores the candidate categories (122). The candidate categories (122) are potential categories that could be assigned to the instance of natural language text (102) as being the selected category (128) (defined below). A candidate category is one of the candidate keywords (114), or possibly a combination of the candidate keywords (114), that taken together form the selected category (128) (defined below).

The data repository (100) also stores one or more pre-determined categories (124). The pre-determined categories (124) are categories that have previously been assigned to past instances of natural language text (e.g., past categories assigned to past flight squawks). The pre-determined categories (124) may be used as some or all of the candidate categories (122). In most cases, the pre-determined categories (124) are only a starting point for determining the selected category (128) (defined below), and thus the candidate categories (122) will have more categories than the pre-determined categories (124).

The data repository (100) also stores one or more similarity measures (126). The similarity measures (126) are an output of the similarity comparison MLM (136) (defined below). The similarity measures (126) are numbers that represent a measurement or a prediction of the similarities between the candidate categories (122) and the pre-determined categories (124). Note that it is not necessarily the case that the pre-determined categories (124) are the only categories in the candidate categories (122). However, if a high similarity occurs for a given one of the pre-determined categories (124), then that given one of the pre-determined categories (124) may be selected as the selected category (128) (defined below). If the given similarity measurement is not high enough, then another one of the candidate categories (122) may be selected as the selected category (128) (defined below). Alternatively, as described further below, a partial category may be returned, or user input may be requested to categorize the instance of natural language text (102).

The data repository (100) also stores a selected category (128). The selected category (128) is the category actually selected for the instance of natural language text (102). The selected category (128) is one or more of the candidate categories (122). Selection of the selected category (128) is described below with respect to FIG. 2A through FIG. 2F.

The system shown in FIG. 1 also includes other components and features. For example, the system shown in FIG. 1 also includes the classification MLM (130) mentioned above and defined below. Again, the term "MLM" is defined as "machine learning model." In general, a MLM is a class of computer algorithm that is used to find patterns in data or to classify data. The classification MLM (130) is, in one embodiment, a binary supervised MLM. In particular, the classification MLM (130) may be a logistic regression MLM or a support vector MLM. However, other types of machine learning models may be used for the classification MLM (130).

Operation of the classification MLM (130) is described with respect to FIG. 2A through FIG. 2F. However, briefly, the classification MLM (130) is programmed to receive, as an input, the first model vector (104), and generate, as output, the corresponding plurality of predictions that the corresponding potential keyword (112) is the corresponding candidate keyword (116).

The system shown in FIG. 1 also includes a candidate category generator (132). The candidate category generator (132) is software that is programmed to generate the candidate keywords (114) and combine the potential keywords (108) into the candidate categories (122). Operation of the candidate category generator (132) is described with respect to FIG. 2A through FIG. 2F.

The system shown in FIG. 1 also includes a vector generator (134). The vector generator (134) is software that is programmed to format data in one type of data structure into a vector data structure. In particular, the vector generator (134) is programmed to transform the candidate keywords (114) into the second model vector (106).

The system shown in FIG. 1 also includes a similarity comparison MLM (136). The similarity comparison MLM (136) is another MLM, distinct from and possibly different than the classification MLM (130). The similarity comparison MLM (136) may also be a supervised MLM. Examples of the similarity comparison MLM (136) may be a cosine similarity MLM and a Euclidian distance MLM.

The operation of the similarity comparison MLM (136) is described below with respect to FIG. 2A through FIG. 2F. However, briefly, the similarity comparison MLM (136) is programmed to receive the second model vector (106) and the pre-determined categories (124) as input, and to return as output the similarity measures (126).

The system shown in FIG. 1 also includes a category selection engine (138). The category selection engine (138) is software or a rules-based policy that is programmed to select the selected category (128) from among the candidate categories (122). In other words, the category selection engine (138) is programmed to assign, based on the similarity measures (126), the selected category (128) to the instance of natural language text (102), and then return the selected category (128).

Optionally, if training the classification MLM (130) and/or the similarity comparison MLM (136) is desirable, then the system shown in FIG. 1 may also include a training engine (140). The training engine (140) is software that is used to train either the classification MLM (130), the similarity comparison MLM (136), or both, together with possibly additional machine learning models. The candidate category generator (132), the vector generator (134), and the category selection engine (138) could be potentially replaced with different types of machine learning models in some embodiments.

Figures 7, 8:
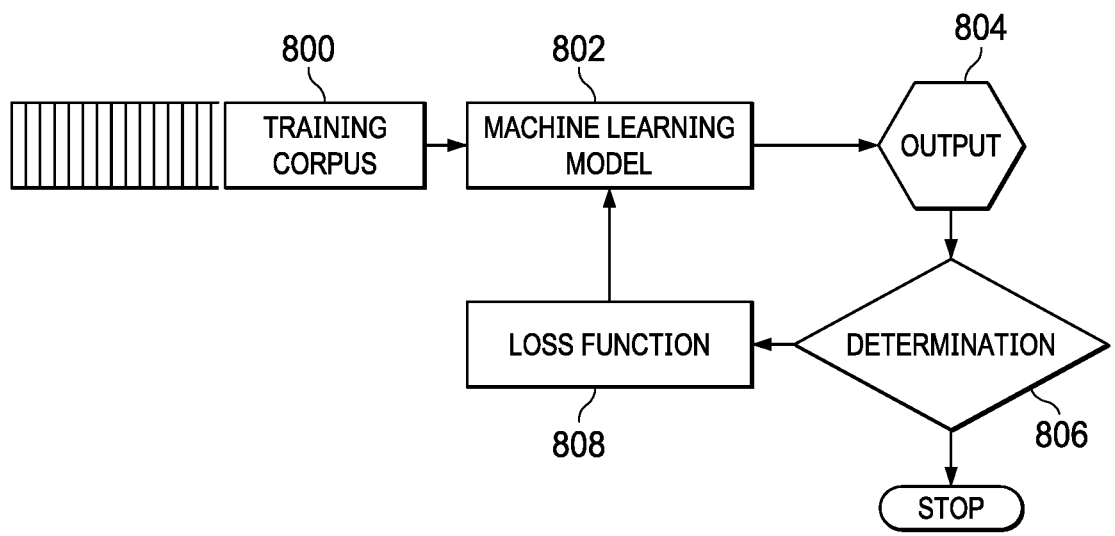
FIG. 8 shows a method for training a machine learning model, in accordance with one or more embodiments.

Operation of the training engine (140) is described with respect to FIG. 8. However, briefly, the training engine (140) is programmed to train one or both of the classification MLM (130) and the similarity comparison MLM (136) according to the training procedures described in FIG. 8.

While FIG. 1 shows a configuration of components, other configurations may be used without departing from the scope of the one or more embodiments. For example, various components may be combined to create a single component. As another example, the functionality performed by a single component may be performed by two or more components.

Figure 2A:
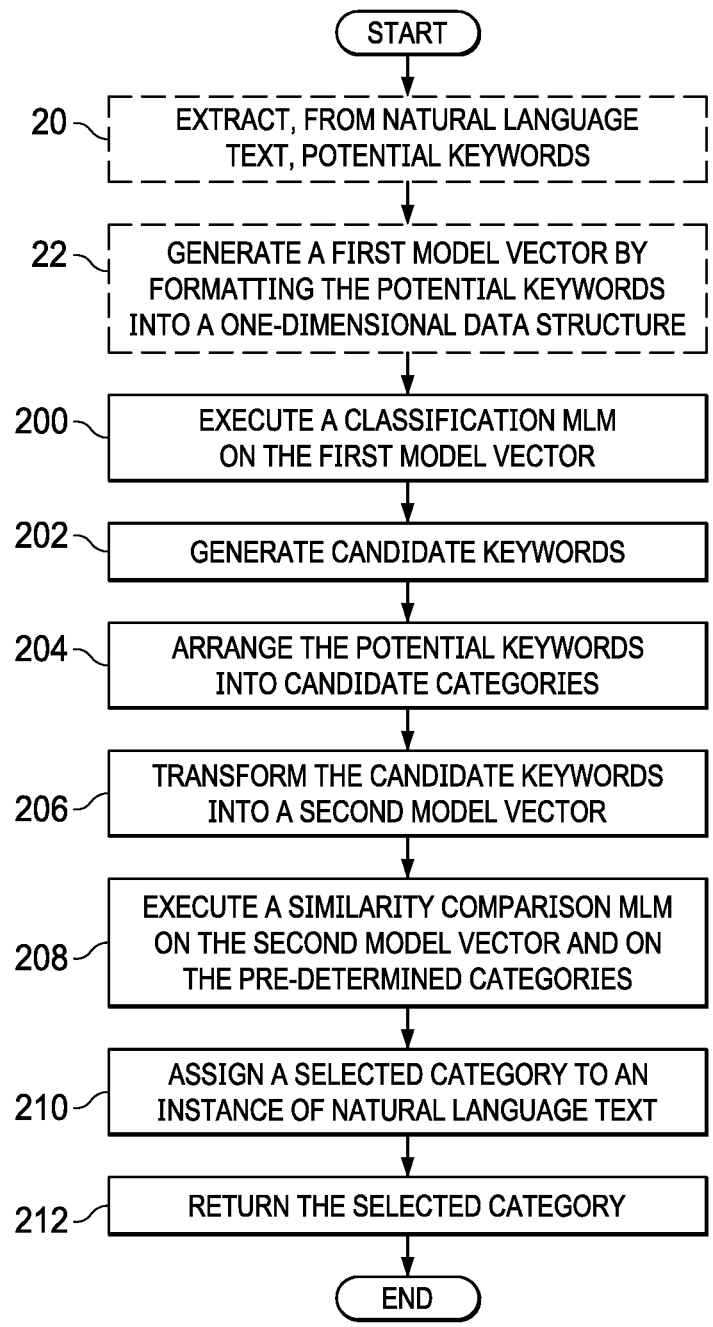
FIG. 2A, FIG. 2B, FIG. 2C, FIG. 2D, FIG. 2E, and FIG. 2F show flowcharts of methods for machine learning for categorizing text, in accordance with one or more embodiments.

FIG. 2A, FIG. 2B, FIG. 2C, FIG. 2D, FIG. 2E, and FIG. 2F show flowcharts of methods for machine learning for categorizing text, in accordance with one or more embodiments. The methods shown in FIG. 2A through FIG. 2F may be performed using the computing system shown in FIG. 1 executed by one or more processors, such as those described with respect to FIG. 9A and FIG. 9B. FIG. 2A, in particular, may be characterized as a method for categorizing an instance of natural language text.

The first two steps shown in FIG. 2A are shown in broken lines to indicate that the steps are optional. In particular, step 20 and step 22 are pre-processing steps. In some embodiments, the underlying data may have already been pre-processed when received. When the underlying data is already pre-processed, then step 20 and step 22 are optional; otherwise, the steps are taken.

At optional step 20, potential keywords are extracted from the instance of natural language text. Words can be identified by software as being composed of alphanumeric text within a pre-determined distance of each other, or by the use of delimiters such as spaces. Each word is extracted and saved as an individual alphanumeric string.

At optional step 22, a first model vector is generated by formatting the potential keywords into a one-dimensional data structure. However, in other embodiments, the first model vector may have a higher dimensionality. Formatting is performed by converting the words into a sequence of features in the first model vector, with the values of the features representing the alphanumeric characters of the word.

At step 200, a classification MLM is executed on the first model vector. In other words, the first model vector is the input to the classification MLM. The classification MLM is executed by one or more processors. The classification MLM algorithm itself depends on the model selected, but may be a binary supervised MLM that operates according to one of a logistic regression MLM and a support vector machine MLM. The classification MLM compares the potential keywords in the instance of natural language text based on the training of the MLM. The output of the classification MLM is corresponding predictions that a corresponding potential keyword is a corresponding candidate keyword.

Thus, for a simple example, as output, keyword A is assigned a probability of 0.2 and keyword B is assigned a probability of 0.5. The numbers represent an estimated prediction or probability that the corresponding keyword is actually a candidate keyword.

At step 202, candidate keywords are generated. In particular, the probabilities generated at step 200 are compared to a first threshold value. Keywords having probabilities that meet and/or exceed the first threshold value are deemed candidate keywords.

Continuing the above example, assume the first threshold value is 0.3. In this case, comparing the assigned probabilities to the first threshold value of 0.3, keyword B is deemed a candidate keyword, but keyword A is not. Thus, the candidate keywords are ones of the potential keywords having selected predictions in the corresponding plurality of predictions that are above the first threshold value.

At step 204, the potential keywords are combined into candidate categories that include combinations of the potential keywords. The potential keywords may be combined using different methods. In one example, all candidate keywords above the first threshold are combined or concatenated, in the order in which they appear in the natural language text. In another embodiment, such candidate keywords are organized alphabetically, are not organized, or may be organized according to syntax using automated rules and policies.

At step 206, the candidate keywords are transformed into a second model vector. The term "second" is only used to distinguish the model vector formed from the candidate keywords from the "first" model vector formed from the potential keywords. Transformation of the candidate keywords into the second model vector may be performed in a manner similar to that described with respect to step 22, above.

At step 208, a similarity comparison MLM is executed on the second model vector and on the pre-determined categories. In particular, a second input of the similarity comparison MLM is the second model vector. Additionally, a third input of the similarity comparison MLM is the pre-determined categories built from at least some of the plurality of candidate keywords. The terms "second" and "third" inputs only are used to distinguish the input to the similarity comparison MLM from each other and from the first input to the classification MLM. In an embodiment, the second input and the third input may be concatenated or otherwise combined into a single vector that is fed as the input to the similarity comparison MLM.

The output of execution of the similarity comparison MLM is the similarity measures that measure similarities between the candidate categories and the pre-determined categories. The similarity measures are expressed as an output vector where the features of the vector are the candidate categories and the values of the vector are the similarity measurements.

At step 210, a selected category is assigned, based on the similarity measures, to the instance of natural language text. The selected category may be selected from among the plurality of candidate categories. For example, the similarity measures indicate that keyword A, keyword B, and keyword C together are candidate categories. One of the pre-determined categories is "keyword A, keyword C". Another of the pre-determined categories is "keyword B". Assume that there is not a pre-determined category of "keyword A, keyword B, and keyword C." The pre-determined category "keyword A, keyword C" most closely matches the candidate categories. Thus, this particular pre-determined category is selected as the selected category. In any case, the selected category is a particular pre-determined category having a highest similarity measure among the various similarity measures.

The selected category may be assigned "based on" the similarity measures using other techniques. As described further below, a partial category may be returned to the user if the candidate categories fail to match the pre-determined categories to the required degree. The partial category is considered not as the "selected category", but rather as a category that requires confirmation or modification by a user. In another example, another policy-based or machine-learning based method (a third MLM) may be applied using the candidate categories and the pre-determined categories to estimate or predict a most likely combination of candidate categories that will match a selected category.

At step 212, the selected category is returned. Returning the selected category means that the selected category is stored for future use, is displayed to a user, is provided to some other software process, or is transmitted to some other computing system. In one embodiment, the method of FIG. 2A may terminate thereafter.

The method of FIG. 2A may be varied by more or fewer or different steps. For example, the method of FIG. 2B may be performed after step 210 of FIG. 2A in order to detect and manage partial categories.

Figure 2B:
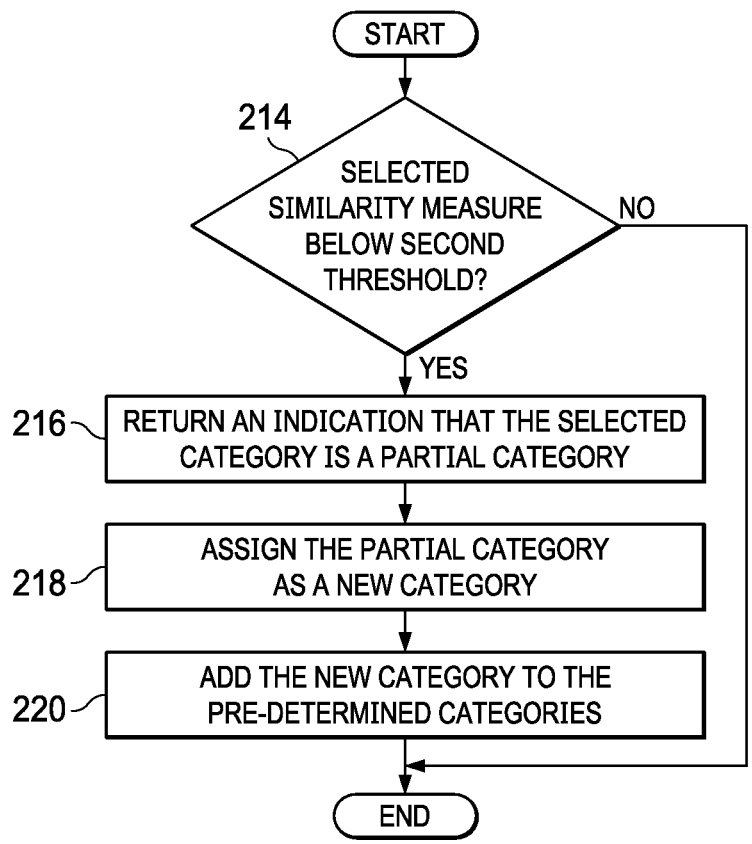

At step 214 of FIG. 2B, a determination is made whether a selected similarity measure is below a second threshold. The determination may be made for all similarity measures in the output. If the determination is "no" (i.e., the similarity measure is above the threshold), then the process ends. In this case, it is assumed that the similarity measure will correspond to at least one of the pre-determined categories, which is returned at step 216.

At step 216, in response to a "yes" determination (i.e., the similarity measure is below the threshold), then an indication is returned that the selected category is a partial category. In other words, the selected category is predicted to be an incomplete description of what a user would believe to be a desired category name.

At step 218, the partial category is assigned as a new category. In other words, it is assumed that the partial category is not in the pre-determined categories, but rather is to be added to the list of pre-determined categories or at least selected to be some other category. Step 218 may be performed by returning the partial category to a user for input, and then receiving user input to define the new category. The user could select from existing pre-determined categories, or the user could add words and create an entirely new category. Other processes are possible, such as additional machine learning processes to predict other words that might be used to add to the partial category.

At step 220, the new category is added to the pre-determined categories. In this manner, the number of pre-determined categories can be expanded as time goes on and reiterations of the one or more embodiments are performed on new instances of natural language text. Thus, for example, over time, less user input will be needed as new flight squawks arrive because the number of pre-determined categories to select from have expanded over time. In one embodiment, the method of FIG. 2B may terminate thereafter.

Other variations are possible. The method of FIG. 2C shows a method of forming a partial category, starting from step 216 of FIG. 2B.

Figure 2C:
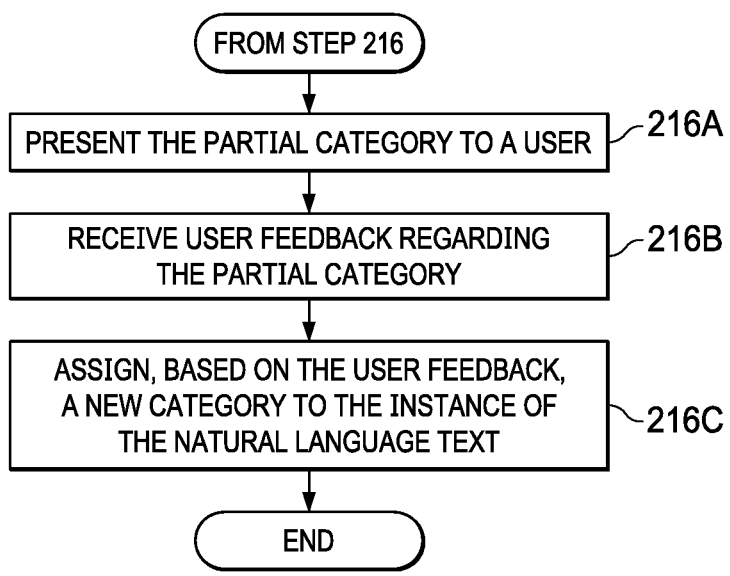

At step 216A of FIG. 2C, the partial category is presented to a user. For example, the partial category can be displayed on a display device, texted to the user, emailed to the user, etc.

At step 216B, user feedback is received regarding the partial category. For example, the user may decide that the partial category is correct (e.g., the pre-determined category selected was correct). The user may decide to add, remove, or change the words of the partial category. Other types of feedback may also be received.

At step 216C, a new category is assigned to the instance of natural language text, based on the user feedback. For example, the user feedback may have been to define the new category, as explained at step 216B. The newly defined category is associated with or otherwise assigned to the associated instance of the natural language text. The new category may also be assigned "based on" the user feedback by further modifying the partial category. For example, the user might request that the process be reiterated with different settings so that a different suggested category will be provided. However, the new category is assigned based on the user feedback. In one embodiment, the method of FIG. 2C may terminate thereafter.

Figure 2D:
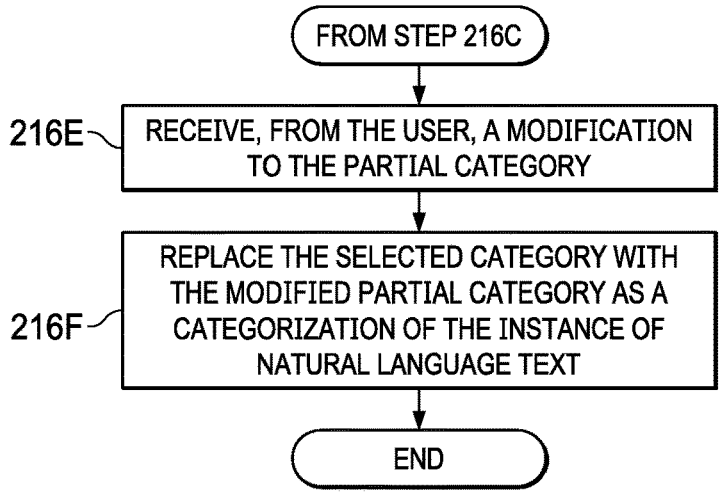

The method of FIG. 2C shows a further variation. Turning to FIG. 2D, after step 216C, the method shown in FIG. 2C may continue.

At step 216E, a modification to the partial category may be received from the user to form a modified partial category, as explained above. In this case, assigning the new category at step 216C instead includes, as shown in step 216F, replacing the selected category with the modified partial category as a categorization of the instance of natural language text. In one embodiment, the method of FIG. 2D may terminate thereafter.

Figure 2E:
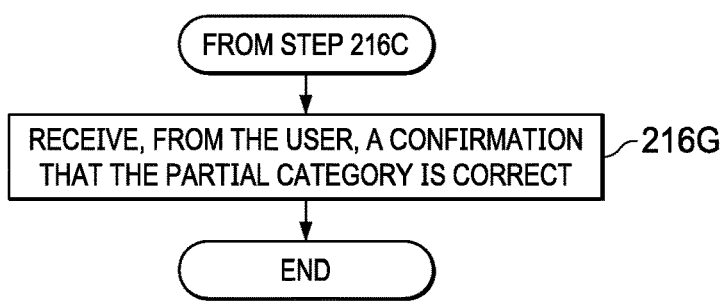

Still another variation is shown in FIG. 2E. The method of FIG. 2E also starts from step 216C of FIG. 2C. At step 216G, a confirmation that the partial category is correct is received from the user prior to returning the selected category. In this case, the partial category is the selected category. In one embodiment, the method of FIG. 2E may terminate thereafter.

Figure 2F:
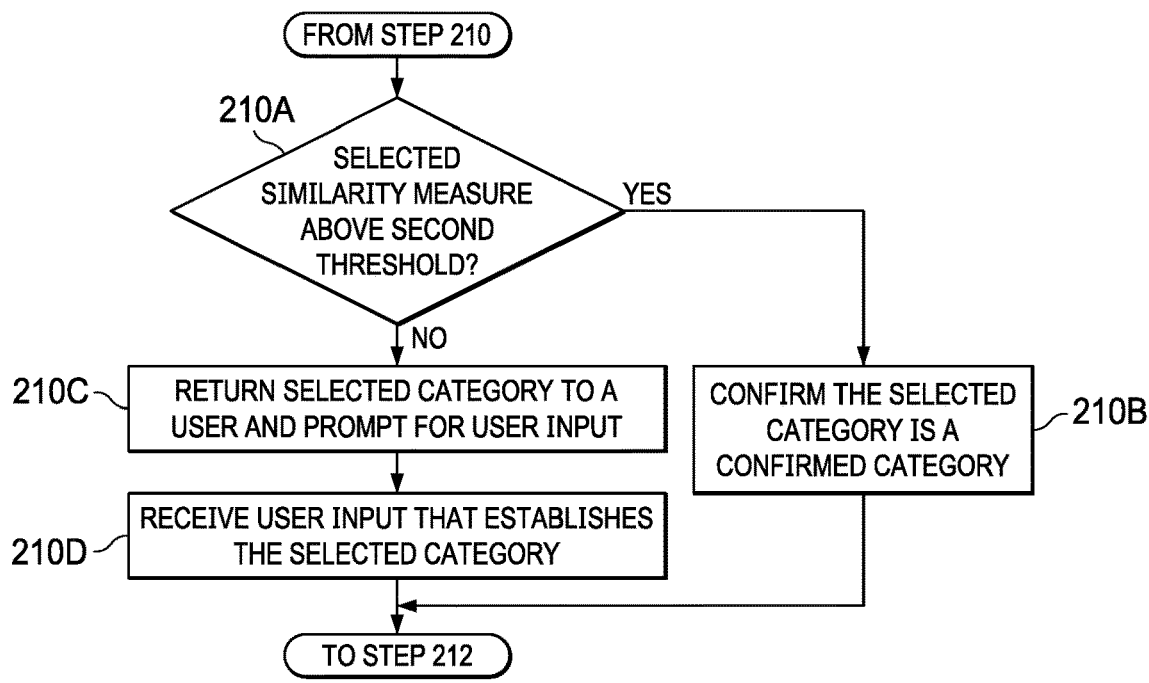

In yet another variation, the method of FIG. 2F shows procedures that may be taken as part of or after step 210 in FIG. 2A. At step 210A, a determination is made whether a selected similarity measure is above the second threshold. In effect, the selected similarity measure of the selected category is compared to the second threshold. If not (i.e., the selected similarity measure is below and/or at the second threshold), then the process skips to step 210C, described below. The similarity measure may also be referred to as a similarity score herein.

If so (i.e., the selected similarity measure is above the second threshold), then at step 210B, the selected category is confirmed as a confirmed category. In other words, the selected category is finalized after being rechecked. The method then proceeds to step 212 in FIG. 2A for further processing. In this case, returning the selected category includes returning the confirmed category.

Returning to a "no" determination at step 210A, at step 210C, a selected category is returned to a user and the user is prompted for input, as described above. Then, at step 210D, user input is received that establishes the selected category, as described above. In one embodiment, the method of FIG. 2F may terminate thereafter.

Note that how the machine learning models described above are trained can change the method. In particular, how a MLM is trained changes the parameters of the MLM, resulting in effect in a different MLM.

In an embodiment, the classification MLM and the similarity comparison MLM are trained using training data including instances of natural language text having corresponding known categories. In this manner, the result of the machine learning models can be improved.

In an embodiment, the training data includes a high data cardinality and a low number of samples. The term "high data cardinality" means that a first number of unique terms in the natural language text above a first pre-determined number. The term "low number of samples" means that a second number of samples is below a second pre-determined number. The second pre-determined number represents a minimum number of samples for direct categorization of the potential keywords using a single classification MLM within a pre-determined degree of precision. Thus, the terms "high" and "low" in the context of the one or more embodiments have a quantifiably ascertainable meaning.

The fact that the training data includes a high data cardinality and a low number of samples affects the method.

In particular, in such a situation, it is not possible to use a single classification MLM to arrive at the selected category. The reasons is that when the training data has a high data cardinality and a low number of samples, then convergence of the machine learning models to within a desired degree is not possible. Stated differently, the machine learning models are not accurate enough for the purposes of the user. Thus, the compound or machine learning ensemble described with respect to FIG. 2A through FIG. 2F is needed in order to arrive at a desired level of accuracy when receiving live (i.e. new) samples of natural language text.

While the various steps in this flowchart are presented and described sequentially, one of ordinary skill will appreciate that some or all of the steps may be executed in different orders, may be combined or omitted, and some or all of the steps may be executed in parallel. Thus, the one or more embodiments are not necessarily limited by the examples provided herein.

FIG. 3 through FIG. 7 present a specific example of the techniques described above with respect to FIG. 1 through FIG. 2F. The following example is for explanatory purposes only and not intended to limit the scope of the one or more embodiments. Because FIG. 3 through FIG. 7 relate to a common example, reference numerals in FIG. 3 through FIG. 7 are used in common and refer to commonly defined objects.

In particular, the one or more embodiments are directed to the application of machine ensembles to automatically categorize flight squawks. As described above, a "flight squawk" is a short text message that describes problems, issues, or results found by test pilots or other test personnel when testing an aircraft. While testing of a single aircraft might result in only tens of flight squawks, testing many new aircraft of the same model type may produce several thousand flight squawks. Thus, an efficiency challenge arises when manually categorizing the flight squawks of a line of aircraft. However, even for a line of aircraft, there may be too few flight squawks for a single machine learning model to achieve a desired level of convergence when automatically categorizing the flight squawks for the line of aircraft.

Figure 3:
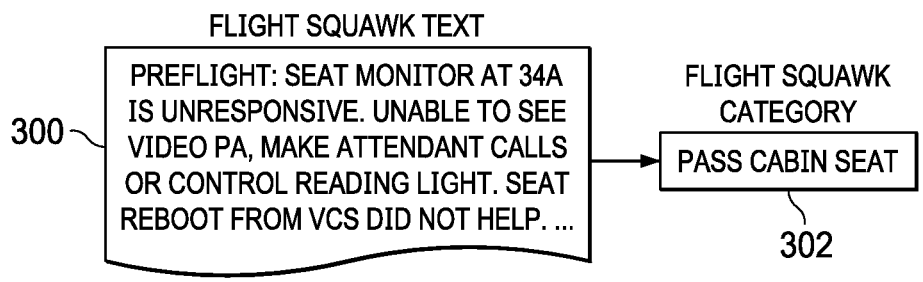
FIG. 3, FIG. 4, FIG. 5, FIG. 6, and FIG. 7 show a specific example of automatic categorization of text according to the machine learning techniques described with respect to FIG. 1 and FIG. 2, in accordance with one or more embodiments.

FIG. 3 shows an example of manually categorizing a flight squawk. In this example, the flight squawk (300) is a short text message that states, "preflight: seat monitor at 34A is unresponsive. Unable to see video PA, make attendant calls or control reading light. Seat reboot from VCS did not help."

To help ensure that the issues raised in the flight squawk (300) are properly addressed, the flight squawk (300) is categorized. The categorization is used for further processing of the flight squawk (300), such as to direct the flight squawk (300) to the correct technical department to address the issues raised in the flight squawk (300).

In this example, a human has read the flight squawk (300) and categorized the flight squawk (300) as shown in category (302). In this case, the category (302) is "pass cabin seat", which is a shorthand category for indicating that the category (302) is "passenger cabin seats". Later, the flight squawk (300) will be forwarded to the proper technical department responsible for handling issues relating to the passenger cabin seats.

Automatic categorization according to the one or more embodiments enables aggregation and subsequent analysis of trends in technical issues. For example, if the delivery center sees that "passenger cabin seats" squawks are recurring or on the rise (even if the squawk texts are written very differently), then the delivery center may decide to divert some attention to performing extra checks or earlier checks on the seats. Alternatively, troubleshooting of the passenger cabin seats may be directed all the way back to the factory and/or the original design engineers.

Figure 4:
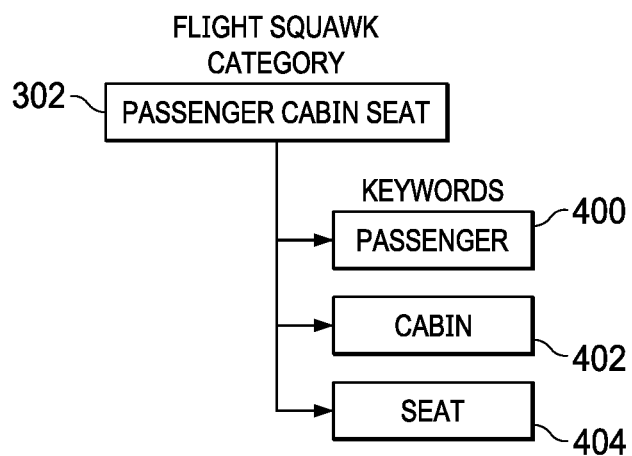

FIG. 4 shows an ontological approach to viewing the category (302) shown in FIG. 3. In particular, the category (302) may be viewed as three different keywords: "passenger" (400), "cabin" (402), and "seat" (404). Note that the term "passenger" (400) does not appear directly in the flight squawk (300), but is implied by the term "PA". The term "cabin" (402) also does not appear in the flight squawk (300), but is implied by the fact that the information in the flight squawk (300) deals with seats, which are only located inside the aircraft. The term "seat" (404) does appear in the flight squawk (300).

Of import, the category (302) is not directly ascertainable by finding corresponding keywords in the flight squawk (300). Thus, it is not possible to use a simple or straightforward approach to automatically categorize the flight squawk (300) with the category (302). The one or more embodiments described above, and summarized by example below, address this technical computer programming issue.

Figure 5:
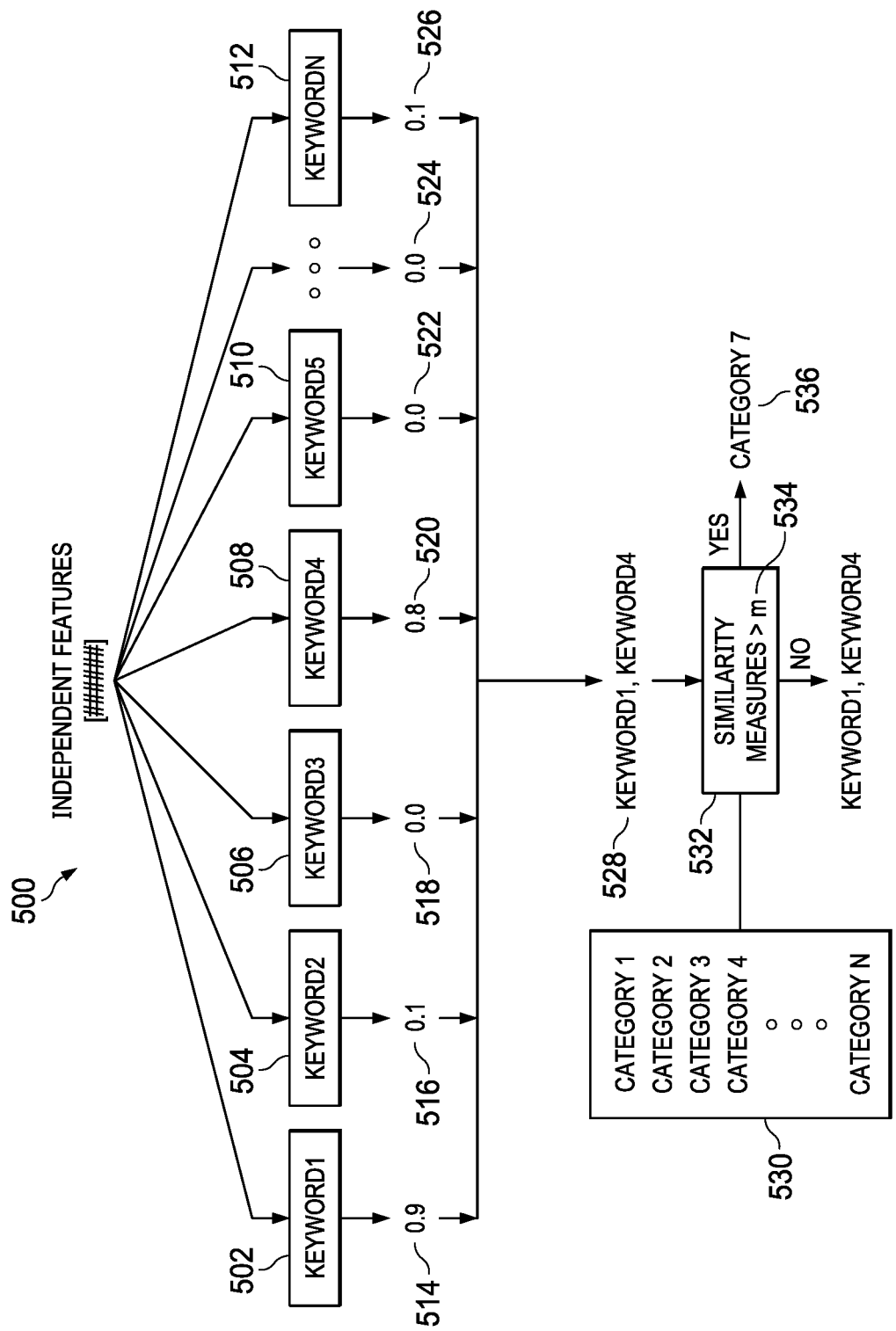

FIG. 5 summarizes in pictorial form an approach to determining a candidate category, as described in steps 200 through 212 in FIG. 2A. The independent features (500) in FIG. 5 are the words in the flight squawk (300) in the form of the first model vector.

As described above in FIG. 2A, the independent features (500) of the first model vector are fed as input to the classification MLM. The classification MLM then outputs potential keywords based on the MLM's training. Thus, for example, the classification output is Keyword 1 (502), Keyword 2 (504), Keyword 3 (506), Keyword 4 (508), Keyword 5 (510), through potentially many more keywords until Keyword N (512) is reached. The Keywords may have been selected from, and the MLM trained on, the available pre-determined keywords in pre-determined categories.

Each keyword is associated with a number. Each number reflects a probability or a prediction that a given keyword will apply to the category (302). Thus, for example, Probability 1 (514) reflects the probability that the Keyword 1 (502) is actually a keyword for the independent features (500), and thus ultimately for the category (302). Similar probabilities are also calculated for the remaining keywords, thus, Probability 2 (516) is associated with the Keyword 2 (504), Probability 3 (518) is associated with the Keyword 3 (506), Probability 4 (520) is associated with the Keyword 4 (508), Probability 5 (522) is associated with the Keyword 5 (510), all the way through the Probability N (526) being associated with the Keyword N (512).

Note, specifically, that the keyword need not have appeared in the category (302) in order to be considered as a keyword. The classification MLM can detect patterns in the independent features (500) of the input vector (which represents the category (302)) to identify which keywords might apply to the category (302).

The probabilities are compared to a threshold (the first threshold in FIG. 2A). In this example, the threshold is 0.79. Keywords with probabilities above the threshold are selected as candidate keywords, as described with respect to FIG. 1 and FIG. 2A. In the example of FIG. 5, the Keyword 1 (502) has a Probability 1 (514) of 0.9 and the Keyword 4 (508) has a Probability 4 (520) of 0.8. Thus, the Keyword 1 (502) and the Keyword 4 (508) are established as candidate keywords (528).

At this point, the candidate keywords (528) are formatted into the second vector and fed as input to the similarity comparison MLM (step 204, step 206, and step 208 in FIG.

2A). In this manner, the candidate keywords (528) can be compared to pre-determined categories (530). The comparison is not a word-for-word comparison, but rather a pattern-based recognition for which a MLM is particularly suited. Thus, the candidate keywords (528) need not all be used in any one of the pre-determined categories (530). Nevertheless, the similarity comparison MLM can detect patterns in the texts of the pre-determined categories (530) which can indicate that the particular combination of the candidate keywords (528) will correspond to a particular one of the pre-determined categories (530).

The output of the similarity comparison MLM is another vector (not shown) which associates a new probability (different than the Probability N (526) described above) with each given category. Those probabilities are the similarity measures (532). Thus, a corresponding similarity measure for the candidate keywords (528) is associated with a corresponding category.

Each corresponding similarity measure in the similarity measures (532) is then compared with a second threshold (534). The second threshold (534) is a pre-determined number. If a given similarity measure in the similarity measures (532) is below the second threshold (534), then the candidate keywords (528) may be returned as a partial category, as described above. Alternatively, the candidate keywords (528) may be presented to a user for manual classification, as described above.

However, if the similarity measure for a given category is above the second threshold (534), then the corresponding category is returned as the selected category (536). In the example of FIG. 5, "category 7" is the selected category (536).

The selected category (536) may be selected according to further processing. For example, the category with the highest similarity measure is returned as the selected category (536), so long as the highest similarity measure meets the second threshold (534). In any case, the result is that some or perhaps all of the flight squawks (of which the flight squawk (300) is only one) are automatically categorized using the machine learning ensemble of the classification MLM and the similarity comparison MLM, as described with respect to FIG. 1 through FIG. 2F.

Figure 6:
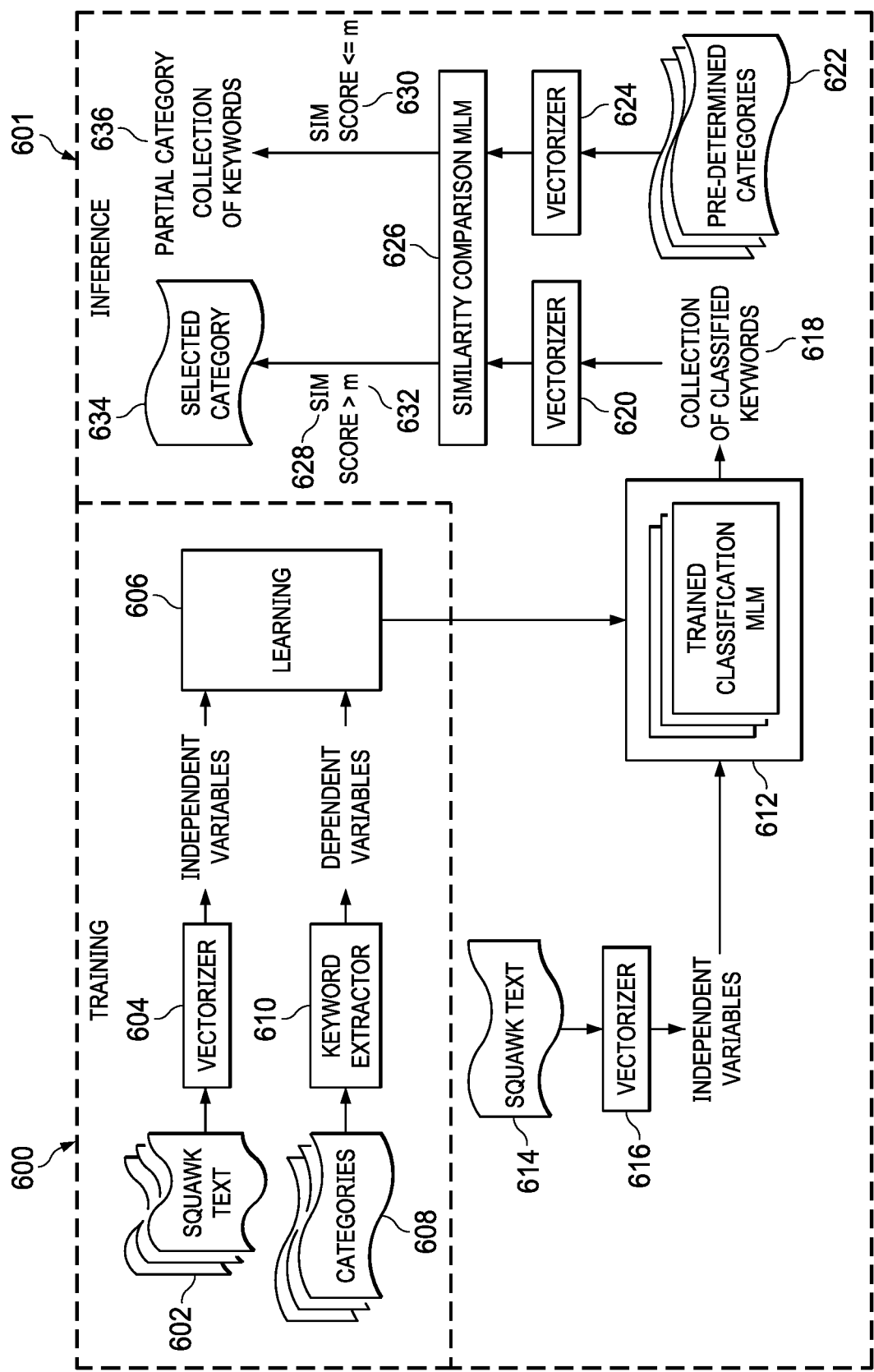

FIG. 6 shows another pictorial representation of the systems and methods described with respect to FIG. 1 through FIG. 2F. Thus, FIG. 6 is an alternative representation to the representation shown in FIG. 5. The example of FIG. 6 is divided into two phases, training (600) and inference (601).

During training (600), squawk texts (602) are formatted by a vectorizer (604) into a vector format. The squawk texts (602) are treated as independent variables. The squawk texts (602), in the form of a first vector, are fed as input to a first machine learning model (606).

Concurrently, categories (608), which are pre-determined categories, are formatted by a keyword extractor (610). The keyword extractor (610) extracts keywords from the categories (608), and formats the keywords as a second vector. The categories (608) are treated as dependent variables. The categories (608), in the form of the second vector, are also fed as input to the first machine learning model (606). Note that the first vector and the second vector may be combined.

The MLM or MLMs are then executed to assign the squawk texts (602) to the categories (608). Because the results are already known, the training process (described in FIG. 8) continues until convergence. The result is a trained classification MLM (612).

At this point, the inference stage is performed on live data (i.e., new squawk texts). Thus, a new squawk text (614) is received. The new squawk text (614) is formatted by a vectorizer (616) into a vector format to form a third vector. The new squawk text (614) is treated as independent variables for the trained classification MLM (612).

The trained classification MLM (612) is now executed, taking the third vector as input. The output of the trained classification MLM (612) is a collection of classified keywords (618). In other words, the trained classification MLM (612) predicts which keywords should be associated with the new squawk text (614), regardless of whether or not any of the collection of classified keywords (618) appears within the new squawk text (614).

In turn, the collection of classified keywords (618) is formatted into a fourth vector by a vectorizer (620). Concurrently, a vectorizer (624) formats the pre-determined categories (622) (which may or may not be the same as the categories (608)) are also formatted into a fifth vector. The fourth vector and the fifth vector may be combined in some embodiments. Regardless, the vector forms of the collection of classified keywords (618) and the pre-determined categories (622) are fed as input to a similarity comparison MLM (626).

Again, the output of the similarity comparison MLM (626) is a series of similarity scores (such as similarity score (628) and similarity score (630)) for each of the candidate categories (which are selected from the pre-determined categories (622)). As described with respect to FIG. 5 and with respect to step 210 of FIG. 2A and step 214 through step 220 in FIG. 2B, the similarity scores are compared to a second threshold (632). The second threshold (632) is represented by "m" in FIG. 6.

As shown in FIG. 6, if the corresponding similarity score is above the second threshold (632), then the candidate category is the selected category (634). Otherwise, if the corresponding similarity score is below or equal to the second threshold (632), then the candidate category is selected as a partial category (636). In the case of the partial category (636), further user input may be provided to confirm or modify the partial category (636). However, because many of the squawk texts will have automatically selected categories (as in the selected category (634)), and because the partial category (636) provides some guidance to the human user, considerable effort is saved in automatically categorizing many new squawk texts.

Attention is now turned to FIG. 7. FIG. 7 is a table (700) representing the experimental accuracy of the one or more embodiments described with respect to FIG. 1 through FIG. 2F and as exemplified by FIG. 3 through FIG. 6. Actual squawk texts from a real test flight of a real aircraft were received. In one case, the squawk texts were provided to a conventional natural language MLM (i.e., a single natural language categorization MLM) for classification. The squawk texts were also provided to the machine learning ensemble (the classification MLM and the similarity measure MLM described with respect to FIG. 1) and the procedures of FIG. 2A were applied to the squawk texts.

The keyword model (702) represents the machine learning ensemble techniques described with respect to the one or more embodiments applied to the flight squawks. The conventional model (704) represents the use of a single classification MLM on the flight squawks. As can be seen, the accuracy (706) of the keyword model (702) was above 40%, but the accuracy (706) of the conventional model (704) was below 35%. Thus, the one or more embodiments were significantly more accurate than the conventional model (704).

Similarly, the misclassification rate (708) of the keyword model (702) was less than 5%, whereas the misclassification rate (708) of the conventional model (704) was greater than 8%. Thus, the techniques of the one or more embodiments resulted in less than half of the misclassifications that the conventional model (704) produced. Thus, FIG. 7 shows that the one or more embodiments produce better results than the conventional natural language processing machine learning approaches typically applied.

Attention is now turned to FIG. 8. FIG. 8 shows a method of training a machine learning model (MLM). The method of FIG. 8 may be applied to train either or both of the classification MLM (130) or the similarity comparison MLM (136) described with respect to FIG. 1. Thus, the training engine (140) described with respect to FIG. 1 may execute the procedure described with respect to FIG. 8 to train these or other MLMs.

Initially, a training corpus (800) is provided. The training corpus (800) is data for which associated information of interest is already known. The training corpus (800) may be, for example, past flight squawks for which corresponding categories are already known.

The training corpus (800) is formatted as a vector. A vector, again, is a data structure composed of features and values. The vector may be a one-dimensional vector having a single row of features, each of which has an associated value. Thus, a vector may, in this case, be considered as a single row of a table, where the cells of the table stores the values and the cells themselves are assigned to different features. A feature is the name of some value being measured, evaluated, or is otherwise something for which a numerical value is provided.

The vector is provided as input to the machine learning model (802). Again, the machine learning model (802) is a mathematical algorithm that is programmed to identify patterns in the training corpus (800) and to use those patterns to associate the training corpus (800) with the information of interest. Thus, for example, the flight squawks (in vector format) may be predicted by the machine learning model (802) to be associated with certain categories.

The machine learning model (802) produces an output (804). The output (804) is also in a vector format. The features of the output vector are the training corpus (800) and the values are probabilities that the information in the training corpus (800) is associated with the information of interest. Thus, for example, a corresponding category be a feature and the value associated with the feature is a prediction (represented by a probability between 0 and 1) that the corresponding feature (the category) is the predicted selected category. Because the output (804) may be many probabilities for many different possible candidate categories, a rule may be used to select one as the actual selected category. In some cases, the category (the corresponding feature) having the highest probability is the predicted selected category. However, more complex selection schemes are possible.

Then, at determination (806), the output (804) is compared to the known results for the training corpus (800). For example, the predicted selected category is compared to the known category from the training corpus (800). If the two match, then convergence occurs, and the process terminates. If the two match within a pre-determined degree, then similarly convergence occurs, and the process terminates. At this point, the machine learning model (802) is deemed trained.

However, if the determination (806) results in an insufficient match between the predicted category (the output (804)) and the known category (from the training corpus (800)), then a loss function (808) is determined. The loss function (808) represents changes to the parameters of the machine learning model (802). Changing the parameters of the machine learning model (802) will change the machine learning model (802) and thus change the output (804) on a subsequent execution of the machine learning model (802). Various schemes exist for determining by how much to change the parameters of the machine learning model (802) based on the degree of difference between the output (804) and the known category from the training corpus (800). Such schemes depend on the type of the machine learning model (802), what parameters it uses, etc.

In any case, the machine learning model (802) is modified based on the loss function (808). As a result, in a sense, a new machine learning model (802) is formed. While the new machine learning model (802) may be of the same type as the original machine learning model (802), the new machine learning model (802) is actually different due to the changed parameters.

The process is then repeated. The training corpus (800) is provided to the new machine learning model (802) and a new output (804) is generated. The determination (806) is repeated.

The training process continues to repeat until convergence, as described above. Again, convergence occurs when the output (804) matches the known categorization of the training corpus (800), or when the output (804) matches the known categorization of the training corpus (800) to within a predetermined degree. Once convergence occurs, the process terminates and the machine learning model (802) is deemed trained.

Figure 9A:
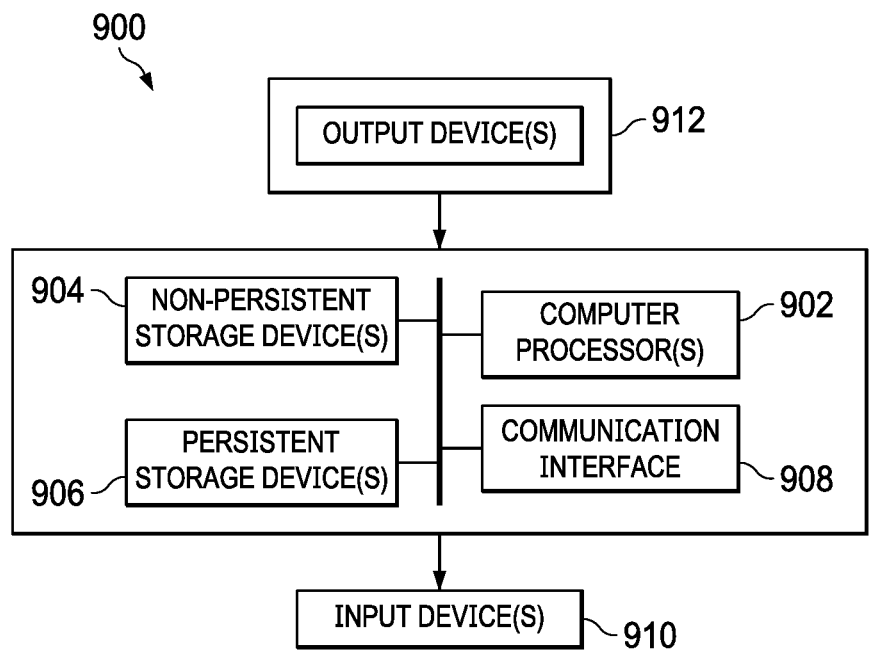
FIG. 9A and FIG. 9B show a computing system and a network environment, in accordance with one or more embodiments.
Figure 9B:
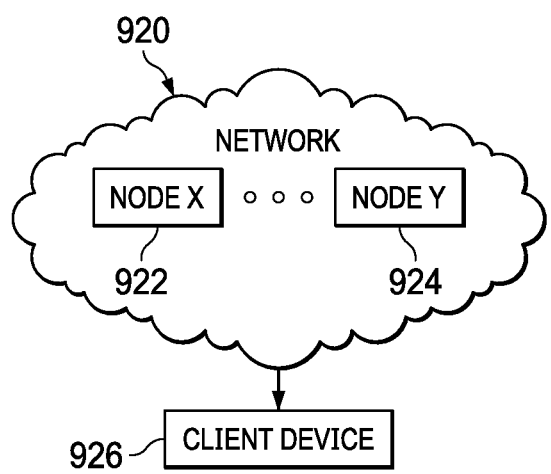

FIG. 9A and FIG. 9B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9A, the computing system (900) may include one or more computer processor(s) (902), non-persistent storage device(s) (904) (e.g., volatile memory, such as random access memory (RAM), cache memory), persistent storage device(s) (906) (e.g., a hard disk, an optical drive such as a compact disk (CD) drive or digital versatile disk (DVD) drive, a flash memory, etc.), a communication interface (908) (e.g., Bluetooth interface, infrared interface, network interface, optical interface, etc.), and numerous other elements and functionalities that implement the features and elements of the disclosure.

The computer processor(s) (902) may be an integrated circuit for processing instructions. For example, the computer processor(s) (902) may be one or more cores or micro-cores of a processor. The computing system (900) may also include one or more input device(s) (910), such as a touchscreen, a keyboard, a mouse, a microphone, a touchpad, an electronic pen, or any other type of input device.

The communication interface (908) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output device(s) (912), such as a screen (e.g., a liquid crystal display (LCD), a plasma display, a touchscreen, a cathode ray tube (CRT) monitor, a projector, or other display device), a printer, external storage, or any other output device. One or more of the output device(s) may be the same or different from the input device(s) (910). The input and output device(s) (912) may be locally or remotely connected to the computer processor(s) (902), non-persistent storage device(s) (904), and persistent storage device(s) (906). Many different types of computing systems exist, and the aforementioned input and output device(s) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, a flash memory, a physical memory, or any other computer readable storage medium. Specifically, the software instructions may correspond to computer readable program code that, when executed by a processor(s), is configured to perform one or more embodiments.

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9A. Further, the client device (926) may include and/or perform all or a portion of one or more embodiments.

The computing system or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing the one or more embodiments, may extract one or more data items from the obtained data. For example, the extraction may be performed as follows by the computing system in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 9A, while performing the one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 9A and the nodes and/or client device in FIG. 9B. Other functions may be performed using the one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A storage device holding instructions executable by one or more processors to:
   receive natural language text;
   extract a list of potential keywords based on the natural language text;
   transform the list of potential keywords into a first model vector;
   execute a classification machine learning model (MLM) trained based on a training corpus comprising a plurality of instances of natural language text and corresponding categories assigned to the plurality of instances of natural language text based on a designated similarity measure, wherein the training corpus comprises a high data cardinality and a low number of samples, wherein the high data cardinality comprises a first number of unique terms in the natural language text above a first pre-determined number, wherein the low number of samples comprises a second number of samples below a second pre-determined number, the second pre-determined number representing a minimum number of samples for direct categorization of the list of potential keywords using a single classification MLM within a pre-determined degree of precision, wherein the classification MLM is configured to
   receive the first model vector generated using the list of potential keywords selected from the natural language text and output a corresponding plurality of predictions that a corresponding potential keyword is a corresponding candidate keyword;
   generate a list of candidate keywords from potential keywords of the list of potential keywords having predictions that are above a first threshold value;
   transform the list of candidate keywords into a second model vector;
   execute a similarity comparison MLM trained based on the training corpus, wherein the similarity comparison MLM is configured to receive the second model vector and a plurality of pre-determined categories built from at least some candidate keywords of the list of candidate keywords as input and output a plurality of similarity scores that indicate degrees of similarities between the list of candidate keywords of the second model vector and the plurality of pre-determined categories as defined by the designated similarity measure, wherein the plurality of pre-determined categories correspond to a plurality of aircraft components;
   assign a selected category from the plurality of pre-determined categories to the natural language text based on a corresponding similarity score of the selected category;
   identify a technical department associated with an aircraft component corresponding to the selected category assigned to the natural language text;
   send the natural language text and the selected category assigned to the natural language text to the identified technical department, wherein the technical department addresses issues with the aircraft component raised in the natural language text.

2. The storage device of claim 1, wherein the storage device holds instructions executable by the one or more processors to:
   compare the corresponding similarity score of the selected category to a second threshold;
   return, responsive to the corresponding similarity score of the selected category being below the second threshold, an indication that the selected category is a partial category;
   responsive to returning the indication that the selected category is the partial category, assign the partial category as a new category different than any of the plurality of pre-determined categories; and
   add the new category to the plurality of pre-determined categories.

3. A method of categorizing natural language text, the method comprising:
   receiving natural language text;
   extracting a list of potential keywords based on the natural language text;
   transform the list of potential keywords into a first model vector;
   executing a classification machine learning model (MLM) trained based on a training corpus comprising a plurality of instances of natural language text and corresponding categories assigned to the plurality of instances of natural language text based on a designated similarity measure, wherein the training corpus comprises a high data cardinality and a low number of samples, wherein the high data cardinality comprises a first number of unique terms in the natural language text above a first pre-determined number, wherein the low number of samples comprises a second number of samples below a second pre-determined number, the second pre-determined number representing a minimum number of samples for direct categorization of the list of potential keywords using a single classification MLM within a pre-determined degree of precision, wherein the classification MLM is configured to receive the first model vector generated using the list of potential keywords selected from the natural language text and output a corresponding plurality of predictions that a corresponding potential keyword is a corresponding candidate keyword;

generating a list of candidate keywords from potential keywords having predictions that are above a first threshold value;

transforming the list of candidate keywords into a second model vector;

executing a similarity comparison MLM trained based on the training corpus, wherein the similarity comparison MLM is configured to receive the second model vector and a plurality of pre-determined categories built from at least some candidate keywords of the list of candidate keywords as input and output a plurality of similarity scores that indicate degrees of similarities between the list of candidate keywords of the second model vector and the plurality of pre-determined categories as defined by the designated similarity measure, wherein the plurality of pre-determined categories correspond to a plurality of aircraft components;

assigning a selected category from the plurality of pre-determined categories to the natural language text based on a corresponding similarity score of the selected category;

identify a technical department associated with an aircraft component corresponding to the selected category assigned to the natural language text;

send the natural language text and the selected category assigned to the natural language text to the identified technical department, wherein the technical department addresses issues with the aircraft component raised in the natural language text.

4. The method of claim 3, further comprising:
comparing the corresponding similarity score of the selected category to a second threshold; and
returning, responsive to the corresponding similarity score of the selected category being below the second threshold, an indication that the selected category is a partial category.

5. The method of claim 4, further comprising:
responsive to returning the indication that the selected category is the partial category, assigning the partial category as a new category different than any of the plurality of pre-determined categories.

6. The method of claim 5, further comprising:
adding the new category to the plurality of pre-determined categories.

7. The method of claim 4, further comprising:
presenting the partial category to a user;
receiving user feedback regarding the partial category; and
assigning, based on the user feedback, a new category to the natural language text.

8. The method of claim 7, further comprising:
receiving, from the user, a modification to the partial category to form a modified partial category; and
wherein assigning the new category comprises replacing the selected category with the modified partial category as a categorization of the natural language text.

9. The method of claim 7, further comprising:
receiving, from the user prior to returning the selected category, a confirmation that the partial category is correct,
wherein the partial category is the selected category.

10. The method of claim 3, further comprising:
comparing the corresponding similarity score of the selected category to a second threshold; and
confirming, responsive to the corresponding similarity score being at or above the second threshold, that the selected category is a confirmed category.

11. The method of claim 3, wherein the selected category is a particular pre-determined category having a highest similarity score of a plurality of similarity scores corresponding to the plurality of pre-determined categories.

12. The method of claim 3, further comprising:
generating the first model vector by formatting the list of potential keywords into a one-dimensional data structure.

13. The method of claim 3, wherein the classification MLM comprises a binary supervised MLM further selected from the group consisting of: a logistic regression MLM and a support vector machine MLM.

14. The method of claim 3, wherein the similarity comparison MLM comprises a supervised MLM further selected from the group consisting of: a cosine similarity MLM and a Euclidian distance MLM.

15. A computing system comprising:
one or more processors; and
a data storage device holding instructions executable by the one or more processors to:
execute a data repository storing:
a first model vector,
a list of potential keywords,
an instance of natural language text, wherein the first model vector is generated using the list of potential keywords extracted from the instance of natural language text,
a corresponding plurality of predictions,
a corresponding potential keyword,
a corresponding candidate keyword, wherein the corresponding plurality of predictions comprises predictions that the corresponding potential keyword is the corresponding candidate keyword,
a list of candidate keywords,
a first threshold value, wherein the list of candidate keywords are potential keywords of the list of potential keywords having selected predictions in the corresponding plurality of predictions that are above the first threshold value,
a second model vector,
a plurality of pre-determined categories built from at least some candidate keywords of the list of candidate keywords,
a plurality of similarity scores that measure similarities between the list of candidate keywords of the second model vector and the plurality of pre-determined categories, and
a selected category;
execute a classification machine learning model (MLM) trained based on a training corpus comprising a plurality of instances of natural language text and corresponding categories assigned to the plurality of instances of natural language text based on a designated similarity measure, wherein the training corpus comprises a high data cardinality and a low number of samples, wherein the high data cardinality comprises a first number of unique terms in the natural language text above a first pre-determined number, wherein the low number of samples comprises a second number of samples below a second pre-determined number, the second pre-determined number representing a minimum number of samples for direct categorization of the list of potential keywords using a single classification MLM within a pre-determined degree of precision, wherein the classification MLM is configured to receive the first model vector generated using the list of potential keywords selected from the natural language text and output the corresponding plurality of predictions that the corresponding potential keyword is the corresponding candidate keyword;

execute a candidate category generator configured to: generate the list of candidate keywords;

execute a vector generator configured to transform the list of candidate keywords into the second model vector;

execute a similarity comparison MLM trained based on the training corpus, wherein the similarity comparison MLM is configured to receive the second model vector and the plurality of pre-determined categories as input and output the plurality of similarity scores that indicate degrees of similarities between the list of candidate keywords of the second model vector and the plurality of pre-determined categories as defined by the designated similarity measure, wherein the plurality of pre-determined categories correspond to a plurality of aircraft components;

execute a category selection engine configured to:

assign, based on the plurality of similarity scores, the selected category to the instance of natural language text;

identify a technical department associated with an aircraft component corresponding to the selected category assigned to the natural language text;

send the natural language text and the selected category assigned to the natural language text to the identified technical department, wherein the technical department addresses issues with the aircraft component raised in the natural language text.

16. The computing system of claim 15, wherein the data repository stores a second threshold value, and wherein the category selection engine is further configured to:

compare a selected similarity score of the selected category to the second threshold value; and return, responsive to the selected similarity score of the selected category being below the second threshold value, an indication that the selected category is a partial category.

17. The computing system of claim 16, wherein the category selection engine is further configured to perform an action selected from the group consisting of:

responsive to returning the indication that the selected category is the partial category, assign the partial category as a new category different than any of the plurality of pre-determined categories;

present the partial category to a user, receive user feedback regarding the partial category, and assign, based on the user feedback, the new category to the instance of natural language text;

receive, from the user, a modification to the partial category to form a modified partial category, wherein assigning the new category comprises replacing the selected category with the modified partial category as a categorization of the instance of natural language text, and receive, from the user prior to returning the selected category, a confirmation that the partial category is correct, wherein the partial category is the selected category.

18. The computing system of claim 16, wherein the category selection engine is further configured to:

compare the selected similarity score of the selected category to the second threshold value; and confirm, responsive to the selected similarity score being at or above the second threshold value, that the selected category is a confirmed category.

19. The computing system of claim 15, wherein the data storage device holds instructions executable by the one or more processors to:

execute a training engine configured to train the classification MLM and the similarity comparison MLM.

20. The computing system of claim 15, wherein the selected category is a particular pre-determined category having a highest similarity score of a plurality of similarity scores corresponding to the plurality of pre-determined categories.

21. The computing system of claim 15, wherein the classification MLM comprises a binary supervised MLM further selected from the group consisting of: a logistic regression MLM and a support vector machine MLM, and wherein the similarity comparison MLM comprises a supervised MLM further selected from the group consisting of: a cosine similarity MLM and a Euclidian distance MLM.

* * * * *